United States Patent [19]

Langner

[11] Patent Number: 4,687,377
[45] Date of Patent: Aug. 18, 1987

[54] METHOD AND APPARATUS FOR SUBSEA FLEXIBLE CONDUIT INSTALLATION

[75] Inventor: Carl G. Langner, Spring, Tex.

[73] Assignee: Shell Oil Company, Houston, Tex.

[21] Appl. No.: 821,923

[22] Filed: Jan. 23, 1986

[51] Int. Cl.[4] ............................................. F16L 1/04
[52] U.S. Cl. .................................... 405/169; 166/338; 405/170
[58] Field of Search ............... 405/169, 168, 170, 171; 166/342, 343

[56] References Cited

U.S. PATENT DOCUMENTS

| | | | |
|---|---|---|---|
| 3,701,261 | 10/1972 | Nolan .................................. | 405/169 |
| 4,264,235 | 4/1981 | Reed et al. .......................... | 405/169 |
| 4,367,980 | 1/1983 | Ames et al. ......................... | 405/169 |
| 4,541,753 | 9/1985 | Langner .............................. | 405/169 |
| 4,558,972 | 12/1985 | Langner .............................. | 405/169 |
| 4,588,326 | 5/1986 | Langner .............................. | 405/169 |

Primary Examiner—Dennis L. Taylor

[57] ABSTRACT

A method and apparatus is presented for connecting a flexible conduit bundle from a subsea wellhead to a floating platform. Movement of the floating platform relative to the subsea wellhead is compensated for by arranging the conduit bundle to be suspended in a catenary manner between the wellhead and the floating platform. The catenary form of the conduit bundle is maintained by bending the circuit around anchor blocks located a selective distance from the subsea wellhead.

22 Claims, 20 Drawing Figures

METHOD AND APPARATUS FOR SUBSEA FLEXIBLE CONDUIT INSTALLATION

RELATED APPLICATION

This application is related to three other applications previously filed by the inventor, Mr. Carl G. Langner, of the present invention. The invention of the present application relates to application Ser. No. 564,605 filed Dec. 22, 1983, entitled "Subsea Pipeline Connection", now Pat. No. 4,588,326; application Ser. No. 499,013 filed May 27, 1983, entitled "Subsea Pipeline Connection"; and application Ser. No. 614,424 filed May 25, 1984 entitled "Flow Line Connection Means", now Pat. No. 4,615,646.

BACKGROUND OF THE INVENTION

1. Field of the Invention

The apparatus and method of the present invention relates to the connection of a flexible conduit such as a flow line or an electrical cable, or a combination of multiple flowlines and cables commonly known as a flowline bundle, between a subsea structure typically located upon the ocean floor and a moveable floating platform positioned above the subsea structure.

2. Description of the Prior Art

As drilling activities progress into deeper offshore waters, new methods and apparatus need be developed to allow for the economic production of oil and gas reservoirs located in these deeper waters. A floating production system (hereinafter FPS), wherein the FPS is a drilling and production platform carried on a moored but otherwise freely floating semi-submersible vessel, appears to be cost effective for use in water depths just beyond the capabilities of fixed bottom-supported structures, for example, in the 1500 to 3000 foot water depth range. Throughout its operational lifetime such an FPS remains moored above the same general area of the seafloor. In a typical deepwater field development using the FPS, a number of subsea wells therefore may be drilled vertically from the FPS within an area defined on the bottom having a radius of approximately 15% of the water depth.

As can be imagined, a problem exists of how to hook up flow lines between the subsea wells and the FPS, in order to carry the flow of production from the on-bottom wells to the FPS floating on the water surface. Typically in this situation, a vertically tensioned riser has been used to connect the subsea wellhead to the FPS. Such a vertically riser consists of a long flowline bundle attached at its lower end to the subsea wellhead and tensioned at its upper end by means of tensioners carried on the FPS. The riser tensioning system used to apply the tension to the entire riser in order to prevent the buckling of the riser justifiably very expensive to install and maintain over the life of a typical production field, for example, 30 years. Such a riser tensioning system must remain in the active state over the entire 30 year life of production from the field in order to prevent damage to the riser. The probability of such a system functioning flawlessly for 30 years is minimal at best, thereby enhancing the chances of a well blowout with associated risks to the FPS, its crew and equipment.

A method and apparatus need be developed therefore that allows a subsea well to be connected in a safe and relatively inexpensive manner to an FPS located substantially vertically above the subsea well location

SUMMARY OF THE INVENTION

The primary purpose of the present invention is to provide a method and apparatus for connecting a flexible conduit, such as a pipeline or electrical cable or flowline bundle between a subsea wellhead and a floating production system located above the subsea wellhead or wellheads. The method and apparatus are relatively simple and economical to use, do not subject the flexible conduit to dangerous stresses, make the flexible conduit readily securable to the subsea wellhead and FPS, and allow the subsequent connections of the flexible conduit to the FPS and the wellhead to be easily made.

More specifically, a method and apparatus are presented for connecting a flexible conduit having a first end and a second end between a first connection means such as the subsea wellhead and a second connection means such as the floating production system. The first connection means is located adjacent the bottom of a body of water having a particular water depth. The second connection means is located adjacent the surface of the body of water and is typically capable of movement due to wind, wave and tide actions, relative to the first connection means.

In a preferred embodiment of the invention, anchor block means are installed on the bottom of the body of water a selected distance from the first connection means. One of the ends of the flexible conduit is then connected to one of the connection means. A portion of the conduit is then operatively passed around and brought into contact with the anchor block means, effectively bending that portion of the conduit. The other end of the conduit is then connected to the other connection means which thereby connects the flexible conduit between the first connection means and the second connection means or in this case between the subsea wellhead and the floating production system.

The key element of the apparatus used in this invention is the anchor blocks forming the anchor block means, which are essentially large diameter cylindrical masses placed on the bottom of the body of water to restrain the sections of the flexible conduit which form a catenary shape to prevent their creeping towards the FPS. Such creeping due to slow drift movements of the FPS could result in damaging loss of horizontal tension in the flexible conduits and subsequent damage due to kinking or fatigue failure of the conduits.

Typically, two or more such anchor blocks would be placed approximately one to two times the water depth horizontal distance away from the FPS. The size of the anchor blocks (approximately 30 feet diameter ×10 foot high) should be sufficient to prevent buckling during bending of the flexible conduits around the blocks or slipping of the conduits over and/or past the anchor blocks as the conduits are bent into place around the blocks. Likewise, the submerged weight of the anchor blocks (approximately 50 to 150 tons) should be sufficient to prevent lateral sliding of the blocks when subjected to the tension loads supplied by the flexible conduits. These anchor blocks may be hollow vertical cylinders of reinforced concrete which, after being placed on the seafloor, would be filled with mud, sand, gravel, or concrete for added weight and stability. Alternatively each anchor block be restrained by one or more piles driven into the seabottom or may be enclosed at the top and incorporate a remotely operated suction pump, thereby comprising a large diameter suction anchor to provide sufficient horizontal anchoring stability.

Several advantages exist therefore for the use of the method and apparatus of the present invention. The invention sets forth a simple, straightforward installation, allows ease of adding new risers as more wells are completed, and ease of repair or replacement if one or more flexible conduits develop leaks. Since the present invention comprises a plurality of flexible conduits suspended in the form of simple catenaries between the sea floor and suspension points on the floating production system, movement of the FPS may be compensated for passively by flexure of the catenarially suspended flexible conduit sections. Movement need not be compensated then by an active conduit tensioning system with its inherent mechanical problems.

These and other features, objects and advantages of the present invention will become apparent from the following detailed description, wherein reference is made to the figures in the accompanying drawings.

DESCRIPTION OF THE PREFERRED EMBODIMENT

Figure 1:
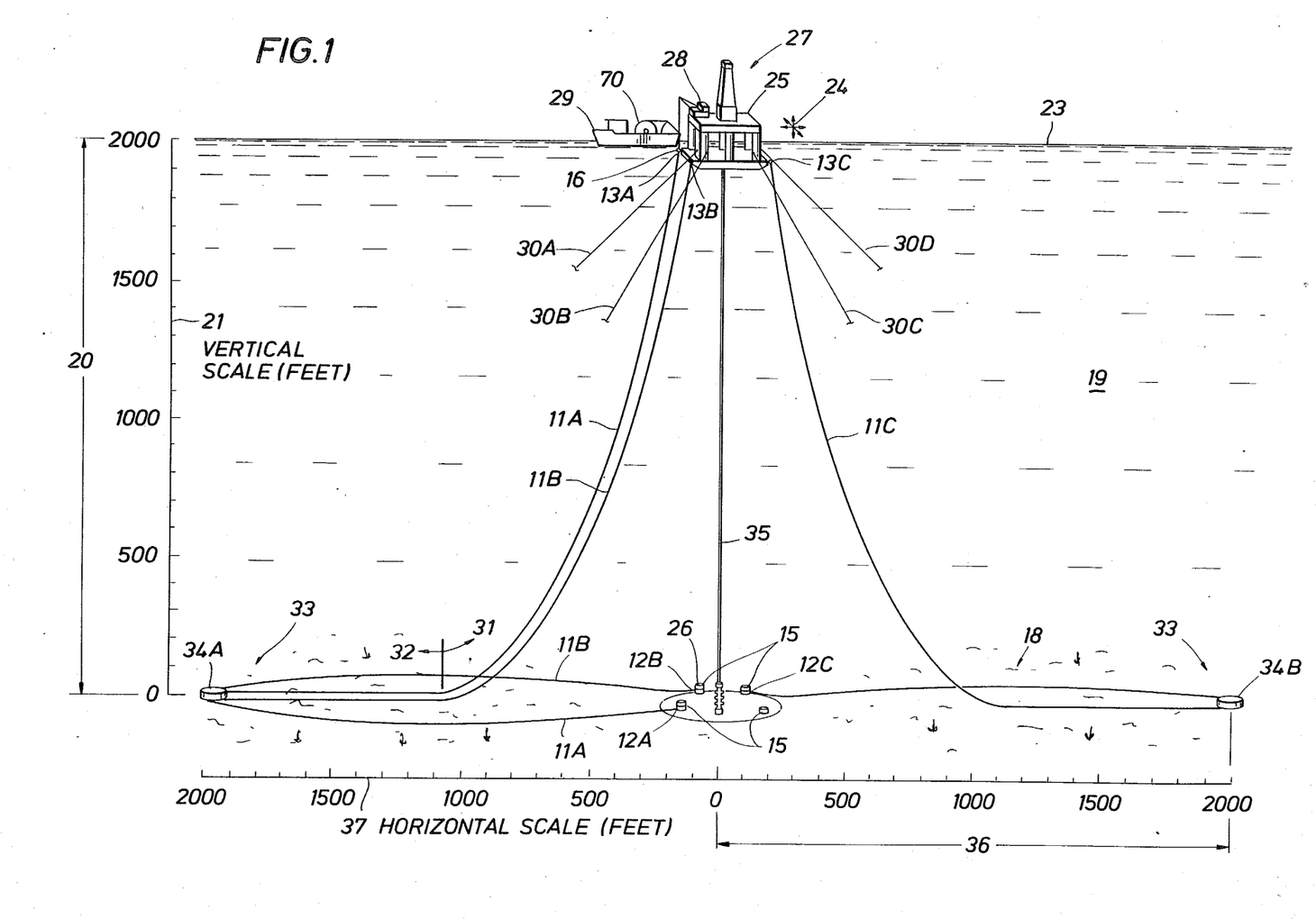
FIG. 1. is a schematic representation showing a floating production system with flexible conduits suspended downwardly therefrom for placing subsea wells in fluid communication with the floating production system.
Figure 2:
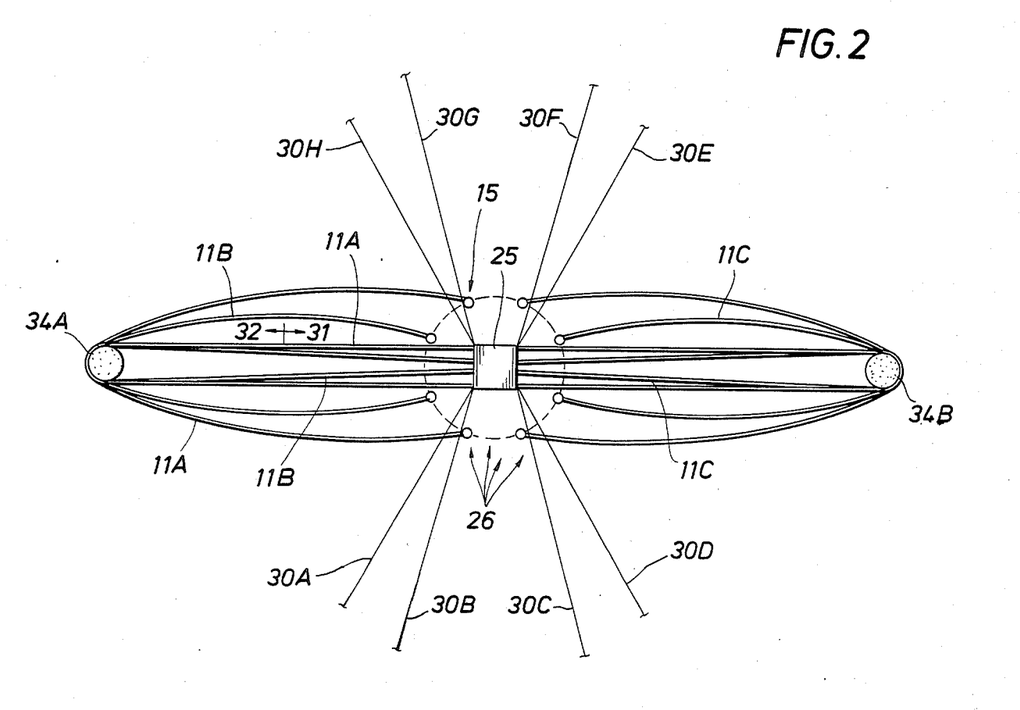
FIG. 2 is a plan view of an apparatus of the present invention showing the route of the flexible conduits around anchor block means.

Referring now to FIGS. 1 and 2 the method and apparatus for connecting a flexible conduit between a first and second connection means is shown. The flexible conduits 11A-C may comprise either bundles of steel flow lines (typically two to four pipes in the size range of one to four inches inside diameter and one control umbilical cable which includes electrical and/or hydraulic lines) or bundles of so-called "flexible" composite pipes which are well known to the art. Preferably the bundles would be twisted together in the form of a helix in order to obtain maximum flexibility, and may be tape wrapped or otherwise banded together to assure integrity throughout the pipelaying process as discussed later. The steel lines or the composite lines would be laid by similar procedure, to be discussed later.

Flexible conduits 11A-C can be seen to have first ends 12A-C and second ends 13A-C respectively. First connection means 15 can be seen to be located adjacent the bottom 18 of a body of water 19 having a particular water depth 20 indicated for example by vertical scale 21. The second connection means 16 can be seen to be located substantially vertically above the first connection means 15 adjacent the surface 23 of the body of water 19. The second connection means 16 are shown being capable of movement shown for example by arrows 24 relative to the first connection means 15. The first connection means may comprise any subsea equipment capable of having a flexible conduit 11A-C connected thereto, such as a subsea wellhead, multi-well template, underwater production manifold, riser base, pipeline tie-in base, electrical or hydraulic terminal box or any other flexible conduit connection device well known to the art. The second connection means 16 may also be any type of apparatus located at or near the water surface that a flexible conduit 11A-C may be connected to, second connection means 16 shown in FIG. 1 mounted on a portion of the first vessel 25. In a preferred embodiment, the first vessel 25 may carry for example a floating production system 27 capable of processing reservoir fluids obtained from subsea wells 26. Conduit end lift means 28 such as a crane well known to the art, is shown carried by the first vessel 25 and is used to lift and transfer the second end 13 of flexible conduit 11 from, for example, second vessel 29 to first vessel 25 as explained later.

Mooring lines 30A-D connected to anchors (not shown) position the first vessel 25 in a substantially fixed horizontal position above the first connection means 15.

Flexible conduit 11A can be seen to have a catenary portion 31 as well as a horizontal portion 32, the latter resting upon the bottom 18 of the body of water 19; similarly for the other two flexible conduits 11B, C. Anchor block means 33 such as anchor blocks 34A, B are shown anchored on the bottom 18. It is well recognized that anchor block means 33 may take any other form necessary to hold flexible conduit 11 stationary at the location of the means 33, such as piles, boulders, etc. Drilling riser 35 is shown extending downwardly from the first vessel 25 the first connection means 15 and is shown connected to one of the wells 26 through a subsea blowout preventer, as is well known in the art.

In general the method of connecting at least one of the flexbe conduits 11A-C between the first connection means 15 and the second means 16 comprises the following steps. First the anchor block means 33 such as anchor blocks 34A, B are installed on the bottom 18 of the body of water 19 a selected distance 36 (reference horizontal scale 37) from the first connection means 15. Then one of the ends 12 (or 13) of a conduit is connected to one of the connection means 15 (or 16). The conduit 11 is then operatively passed around and brought into contact with one of the anchor block means 33 and thereafter the other of said ends 13 (or 12) of the conduit 11 is connected to the other of the connection means 16 (or 15) thereby connecting the flexible conduit 11 between the first connection means 15 and the second connection means 16.

More specifically, the first end 12 of the conduit 11 is connected to the first connection means 15, then the flexible conduit 11 is laid away from first connection means 15 and is operatively passed around and brought into contact with a portion of the anchor block means 33, thus bending the flexible conduit 11 back towards the first vessel 25, and thereafter the second end 13 of the conduit 11 is laid back to the first vessel 25 and connected to the second connection means 16.

Figure 3:
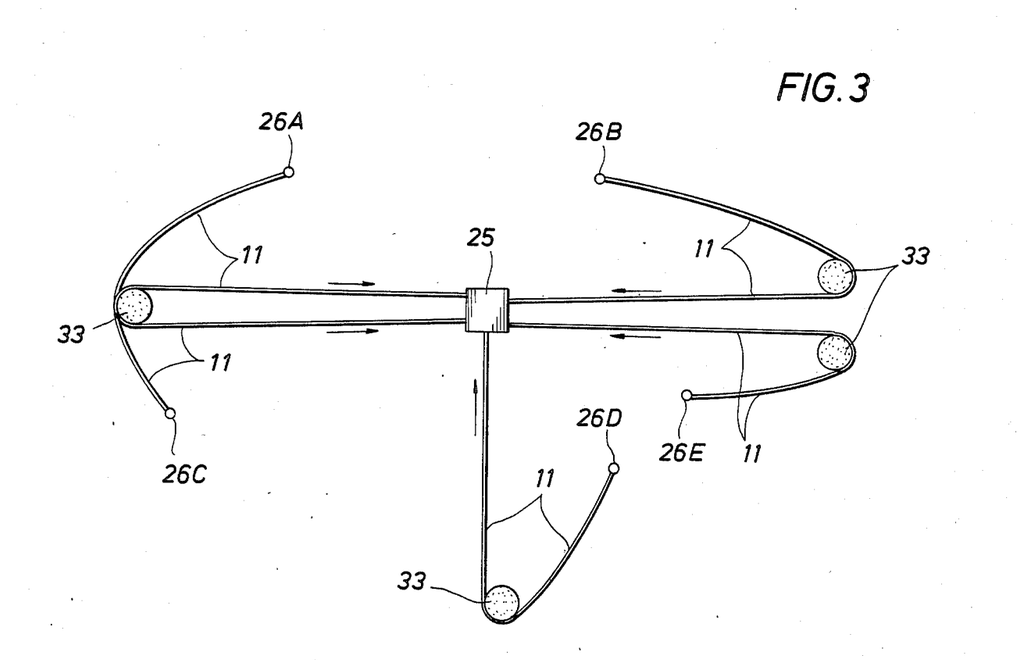
FIG. 3 is a plan view showing an alternative routing of the flexible conduits around the anchor block means.

A complete system of installed flexible conduits 11 is shown in more detail in FIG. 2. The flexible conduits 11 in this case connect eight subsea wells 26 to eight connection means on the first vessel 25. A complete set of eight mooring lines 30A-H is also shown extending partway to the mooring anchors (not shown). The route of flexible conduits 11A-C are also shown, along with the other flexible conduits (not labeled for clarity). FIG. 3 shows an alternative routing scheme for the flexible conduits 11, starting from the subsea wells 26A-E, passing around the anchor blocks 33, and connected back to the first vessel 25. Here the subsea wells 26A-E are shown to be located substantially away from instead of directly below the first vessel 25.

Figure 4:
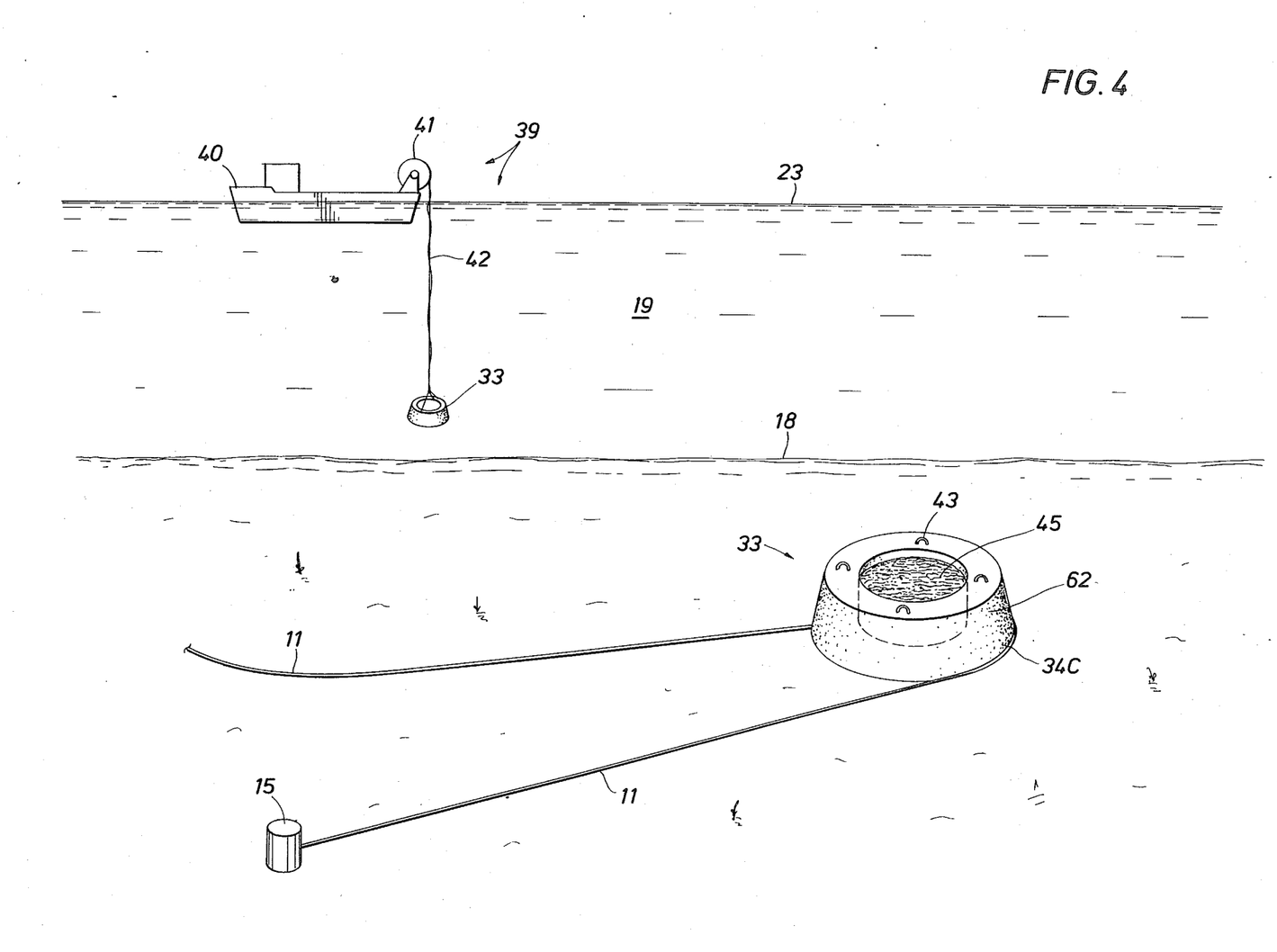
FIG. 4 is a schematic representation showing an anchor block positioned upon the bottom of the body of water.

Referring now to FIGS. 4-7 the step of installing the anchor block means 33 such as anchor block 34C shown in FIG. 4 may be described in more detail. The anchor block 34C is lowered downward through the body of water 19 by means of anchor block lowering means 39 such as a vessel 40 and a drum 41 carried by the vessel, the drum 41 carrying cable 42 lowerable down through the body of water 19 with the anchor block means 33 typically suspended from the lower end of the cable 42 by means well known to the art. Cable 42 may be typically connected to lifting lugs 43, carried on the upper surface of the anchor block 34C. Weighting material 45 (FIG. 3) such as mud, sand, gravel, or concrete may be added by means well known to the art to anchor block 34C to increase the weight and therefore the sliding resistance of the anchor block 34C.

Figure 5:
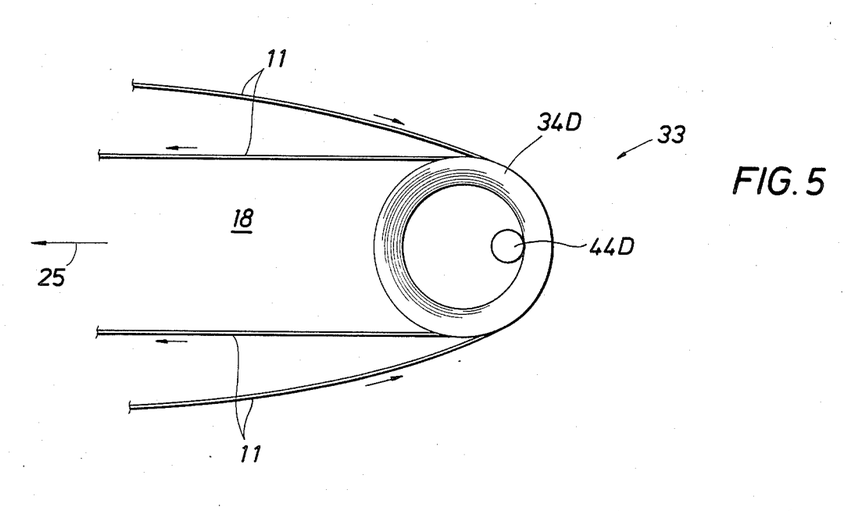
FIG. 5 is a plan view of an anchor block anchored to the bottom by means of a pile.
Figure 6:
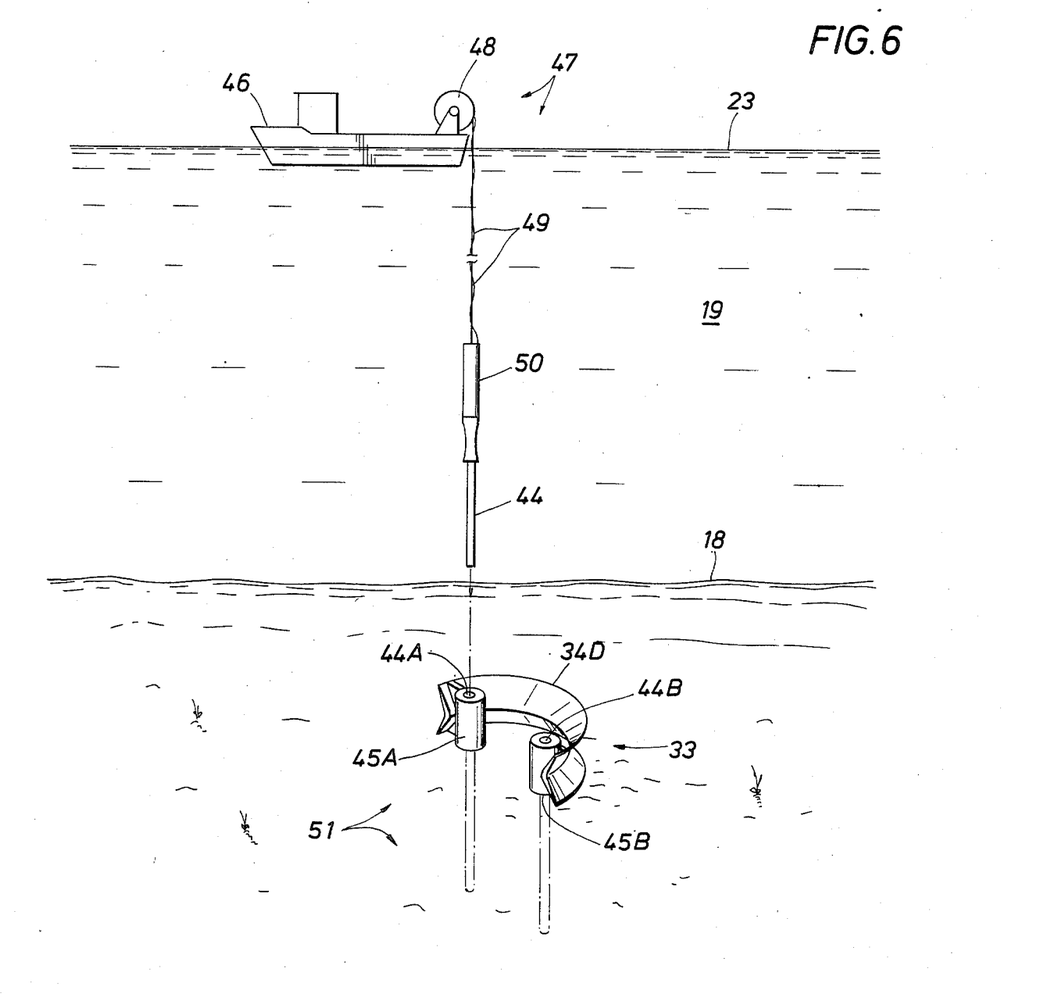
FIG. 6 is a schematic representation showing an alternative embodiment of an anchor block, and also the pile driving means apparatus used for installation of a pile.

The submerged weight of the anchor block 34C should be made sufficient to prevent the flexible conduit 11 from pulling the anchor block 34C towards the first vessel 25. Alternatively, the anchor block may be restrained by a pile as shown in FIG. 5 or 6. Referring to FIG. 6, a pile 44A may be lowered downwardly from a vessel 46 carrying pile driving and lowering means 47 which may consist for example of a drum 48 carrying cable 49 connected at the lower end thereof to a pile driver 50. The pile driver 50 may be used to drive the pile 44A downwardly through at least one pile conductor 45A into the bottom 18, the pile conductors 45A, 45B provided for each of the piles 44A, 44B required to anchor the anchor block means 33 such as the anchor block 34D to the bottom 18. The pile conductors 45A, 45B may be operatively connected to the anchor block 34D by means well known to the art. Note that the piles 44A, 44B and pile conductors 45A, 45B form the necessary anchoring means 51 for the anchor block 34D shown in FIG. 6. In an alternative embodiment shown for example in FIG. 5 note that only one pile 44D may be necessary to anchor the anchor block 34D to the bottom 18.

Figure 7:
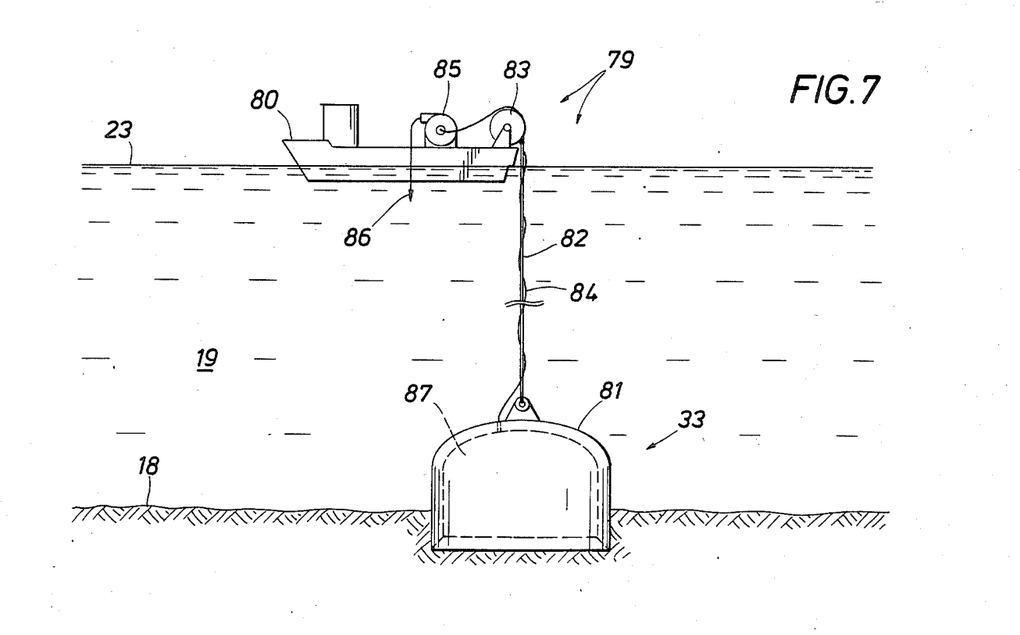
FIG. 7 is a schematic representation showing the installation of an anchor block by use of suction.

In another embodiment of the present invention suction means 79 may be placed in fluid communication with a suction cavity or chamber defined upwardly through the lower end of the anchor block means 33. As shown in FIG. 7, a vessel 80 has lowered an anchor block 81 into contact with the bottom 18 of the body of water 19, the anchor block 81 being lowered by means of cable 82 unreeled from reel 83. Suction conduit 84 has been placed in fluid communication between a pump 85 connected to discharge conduit 86 and a suction cavity 87 formed within anchor block 81. Actuation of pump 85 decreases the pressure within suction cavity 87, thereby causing anchor block 81 to be forced by hydrostatic pressure downwards into bottom 18, effectively anchoring the anchor block 81 to the bottom 18.

Note that the final location of the anchor block means 33 relative to the first vessel 25 in a preferred embodiment (see FIGS. 1-3) may be between one and two water depths distance away from the first connection means 15. For anchor block locations between 1.0 and 1.5 water depths away, the lengths of flexible conduits would be minimized, but the anchor blocks would need to be specially stabilized by adding weighting materials, piles, or suction, as shown in FIGS. 4-7. For anchor block locations between 1.5 and 2.0 water depths away, the lengths of flexible conduits would not be minimum, but the anchor blocks, as installed, would be stable (not move) under normal operating loads. In this case the weight of the anchor blocks would only need to resist the horizontal tension during the laying of each flexible conduit.

Figure 8:
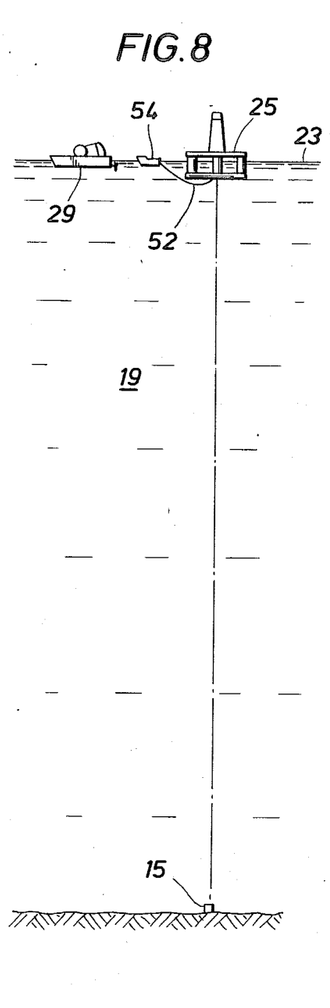
FIG. 8 shows the initial procedure of the invention for connecting a flexible conduit to a first connection means such as a subsea structure, wherein a first vessel such as the FPS moored vessel is stationed directly over the first connection means with a second vessel such as a pipelay vessel stationed a short distance away. A pull-cable is passed between the first vessel and the second vessel.

The initial procedure of the present invention of connecting the first end 12 of the flexible conduit 11 to the first connection means 15 is shown in FIG. 8 wherein first vessel 25 is positioned above, preferably substantially directly over the first connection means 15. Positioned close to the first vessel 25 is second vessel 29, typically a pipelay vessel, the first and second vessels 25, 29 preferably spaced from 500 to about 2,000 feet apart. Once the first vessel 25 and second vessel 29 are on station, pullcable 52 is taken from one vessel to the other vessel, preferably from first vessel 25 to second vessel 29 by a smaller transport vessel 54.

Figure 9:
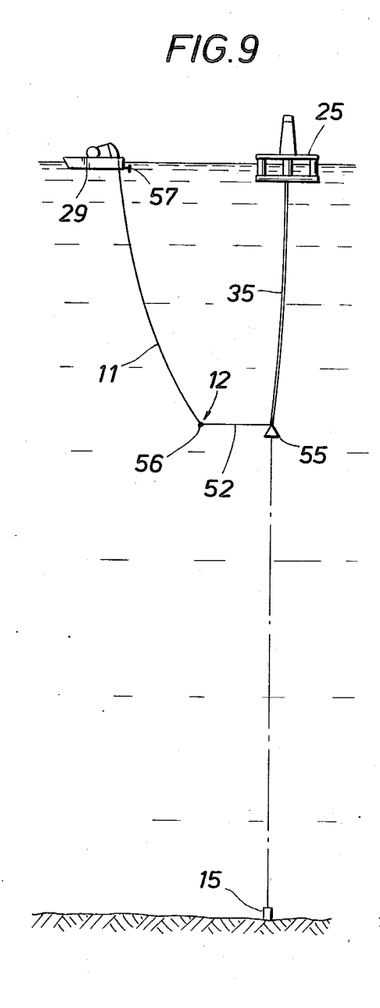
FIG. 9 shows the process of lowering a connection tool at the end of a riser from the first vessel simultaneously while paying out the flexible conduit from the second vessel.
Figure 10:
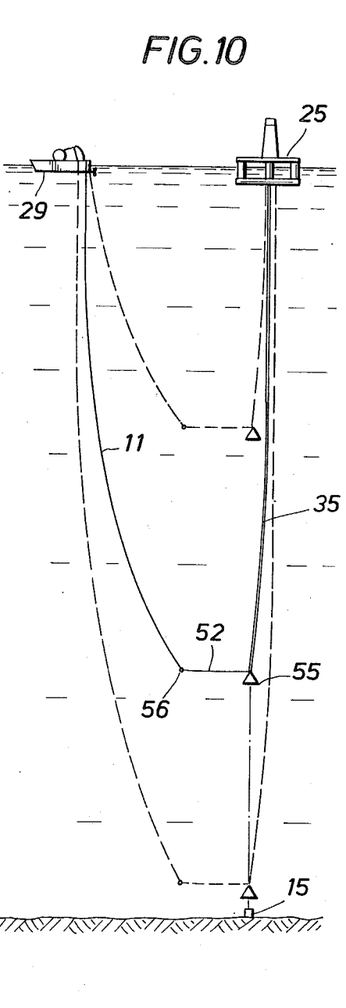
FIG. 10 discloses continued simultaneous lowering of the riser and connection tool from the first vessel and the flexible conduit from the second vessel, alternatively depicting shallow, intermediate, and deep configurations.

As shown in FIG. 9, pullcable 52 is attached to riser 35 shown being lowered from first vessel 25. At the lower end of riser 35 is a connection tool 55, more fully described in FIGS. 15, 16 and 17 and to which is preferably attached pullcable 52. At the opposite end of pullcable 52 is attached a flexible conduit 11, which is being laid from the second vessel 29. Preferably pullcable 52 is attached to a conduit terminal head 56 attached to the first end 12 of conduit 11. The length of the pullcable 52 may vary preferably from about 100 feet to about 1,000 feet. Most preferably, the pullcable length between the connection tool 55 and the conduit terminal head 56 should be approximately 10% of the water depth throughout the lowering operation. Connection tool 55 and riser 35 are lowered from the first vessel 25 simultaneously while the flexible conduit 11 is paid out from the second vessel 29, as shown in FIGS. 9 and 10. The preferred rate of lowering is generally in the order of 10 to 100 feet per minute. Propulsion means 57 such as a prime mover coupled to one or more propellers are used to propel and maintain position of second vessel 29 relative to first vessel 25.

In FIG. 10 is shown various configurations of the riser, flexible conduit and pullcable, depending upon the payout length of the riser and conduit. It is evident that the first and second vessel 25, 29, respectively, become further apart, proceeding from shallow configuration (in phantom) to intermediate configuration, to deep configuration (in phantom) in order to maintain a constant horizontal tension in the pullcable 52 and the flexible conduit. Also evident from FIG. 10 is the movement of the first vessel 25 from directly above the first connection means 15 to a short distance beyond as the length of the riser increases. The relative positioning of the first vessel and second vessel depends also upon the relative weights of the riser, flexible conduit, and connection tool. Thus, for a substantially heavier conduit as compared to the riser, the second vessel must be positioned further out. Positioning of the vessels must also take into account the effects of any currents.

A vital part of the connection tool 55 during the lowering stage in the connection procedure will be a mechanism for cutting or otherwise quickly releasing the pullcable 55 from the connection tool. In the event that one or both of the surface vessels 25, 29 are no longer able to hold their position, for example, this quick-release mechanism would disconnect the conduit 11, together with a length of pullcable 52, from the riser 35 and the connection tool 55, thereby enabling each element to be safely recovered onto the respective surface vessel prior to making another attempt to connect the conduit to the first connection means 15.

Figure 11:
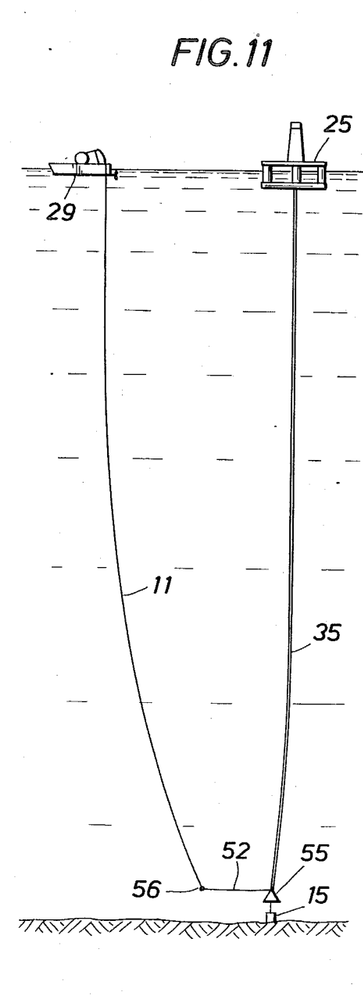
FIG. 11 shows the suspension of the connection tool and riser a short distance above the first connection means in preparation for landing the connection tool onto the first connection means.
Figure 12:
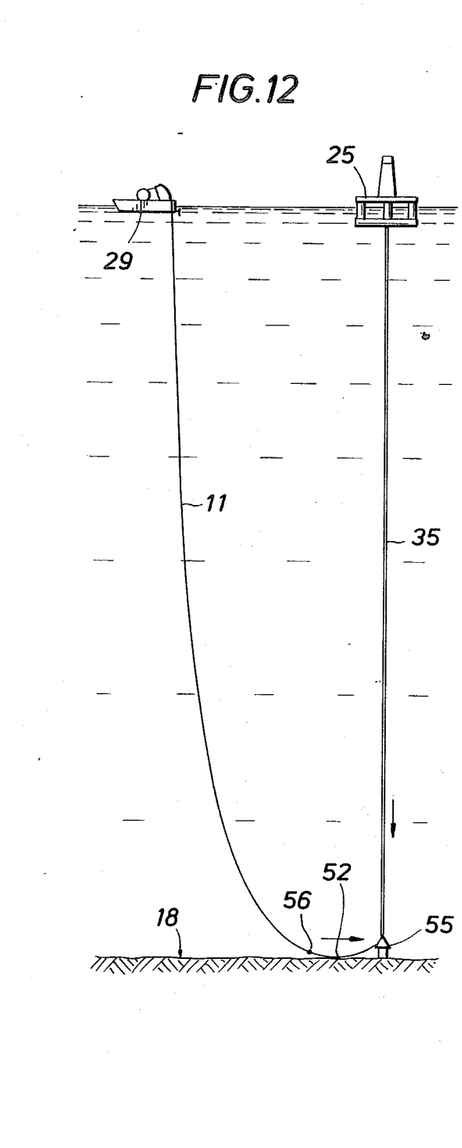
FIG. 12 depicts landing the connection tool on the first connection means and pulling the flexible conduit up to the connection tool. The flexible conduit may first be lowered onto the bottom of the body of water or it may be positioned a short distance above the bottom during this landing and pull-in operation. The conduit is then oriented and secured to the first connection means using remotely operated mechanisms of the connection tool.
Figure 13:
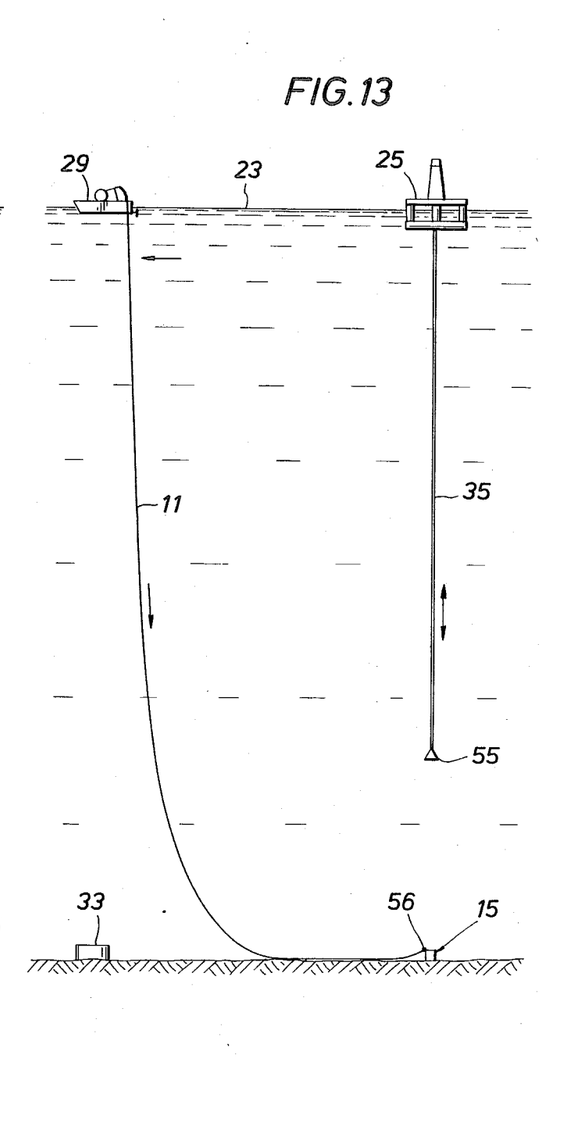
FIG. 13 shows the recovery of the riser and connection tool to the surface and the commencement of the process of laying the flexible conduit away from the first connection means.

FIG. 11 shows the connection tool 55 positioned directly above the first connection means 15 in preparation for landing the connection tool 55 onto the first connection means 15. At this stage movement of the connection tool 55 is affected primarily by movement of the first vessel 25 and riser 35, but also is affected somewhat by movement of the second vessel 29 and conduit 11. Consequently, as shown in FIG. 12, it may be preferable to lower part of conduit 11 and pullcable 52 onto seafloor 18 in order to isolate motions of conduit 11 from riser 35 and connection tool 55. In this case movement of the connection tool in the direction of the pullcable may be controlled by paying out or pulling in the pullcable 52 from the connection tool 55. As a general rule, one must never allow the pullcable 52 to become slack, as a slack cable is much more likely than a taut cable to self-tangle or to become snagged around some object on the bottom 18 of the body of water 19.

In FIG. 12 connection tool 55 has been landed on the first connection means 15 and the termination 56 of the conduit 11 has been pulled up to the connection means 15 by means of pullcable 52. It may have been necessary for the connection tool 55 to grip and properly orient the conduit terminal head 56 prior to securing it to the connection means 15. Once the terminal head 56 has been connected to first connection means 15, the riser 35 and connection tool 55 may be disconnected from first connection means 15 and returned to the first vessel 25 on the surface 23.

Figure 14:
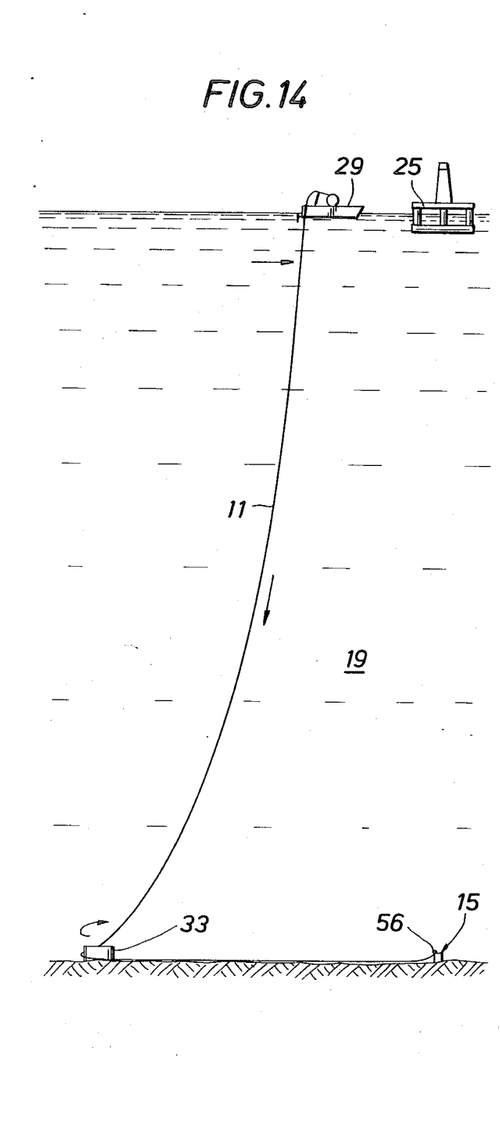
FIG. 14 shows the laying of the flexible conduit around the anchor block means by the second vessel, and the laying of the flexible conduit back to the first vessel in preparation for securing said flexible conduit in the second connection means.

As shown in FIG. 14 pipelaying from the first connection means 15 has commenced, and the flexible conduit 11 has been laid to the anchor block means 33, and around the anchor block means 33 by movement of the second vessel 29, continuing in this manner to lay the flexible conduit 11 back to the first vessel 25.

It is well recognized that the flexible conduit 11 may be laid on the bottom 18 from the first connection means 15 and thereafter the riser disconnected from the flexible conduit 11 at the first connection means 15. Alternatively, the riser 35 may be disconnected from both the flexible conduit 11 and the first connection means 15 and thereafter the flexible conduit 11 may be laid on the bottom 18 away from the first connection means 15.

Figure 15:
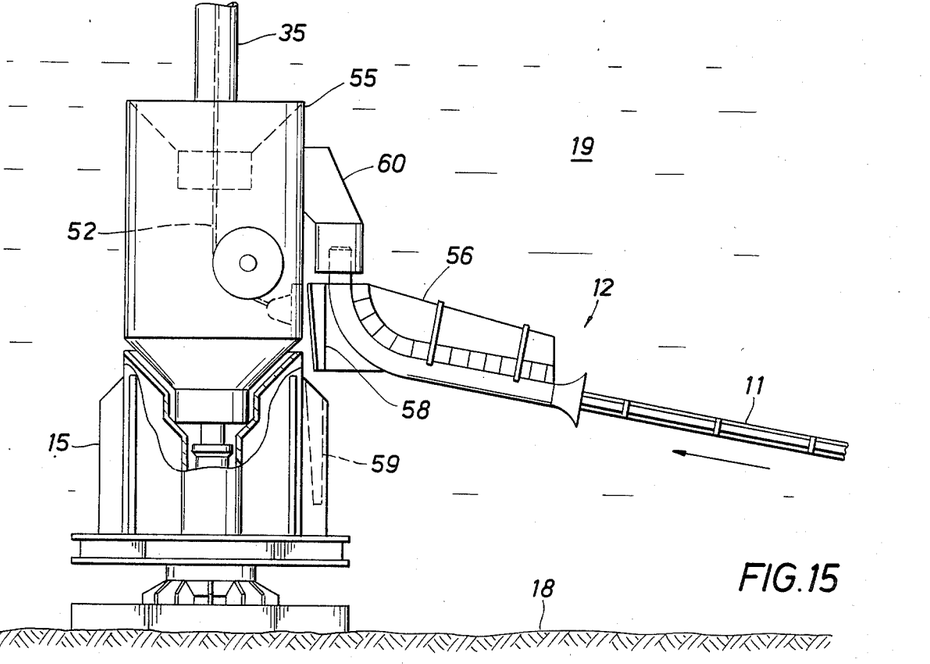
FIGS. 15 through 17 show in more detail the steps of connecting the first end of the flexible conduit to the first connection means, by use of a connection tool suspended from a vertical riser.
Figure 16:
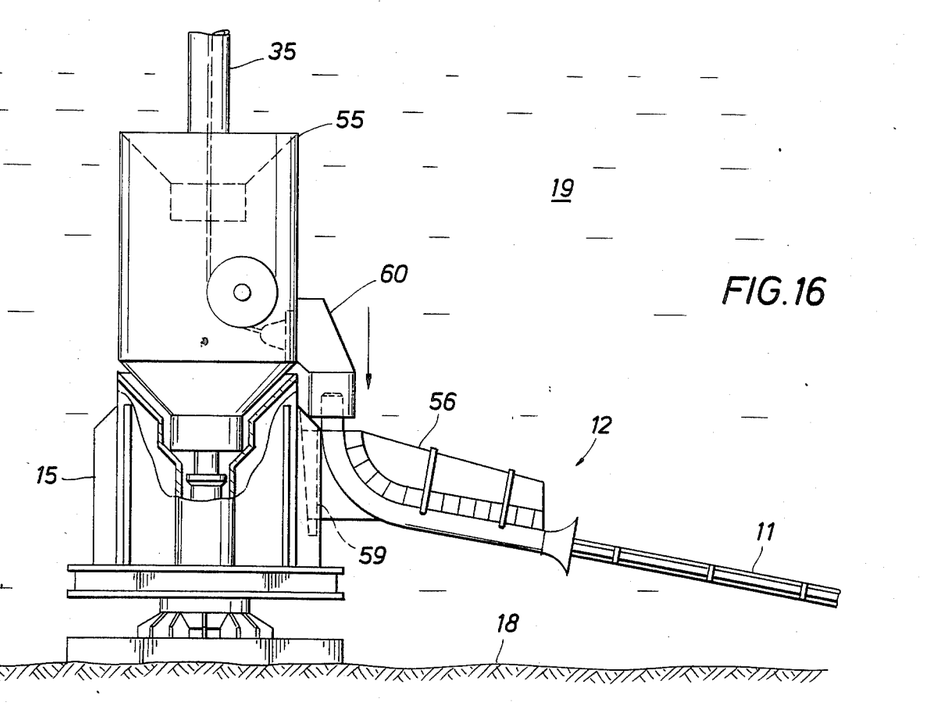
Figure 17:
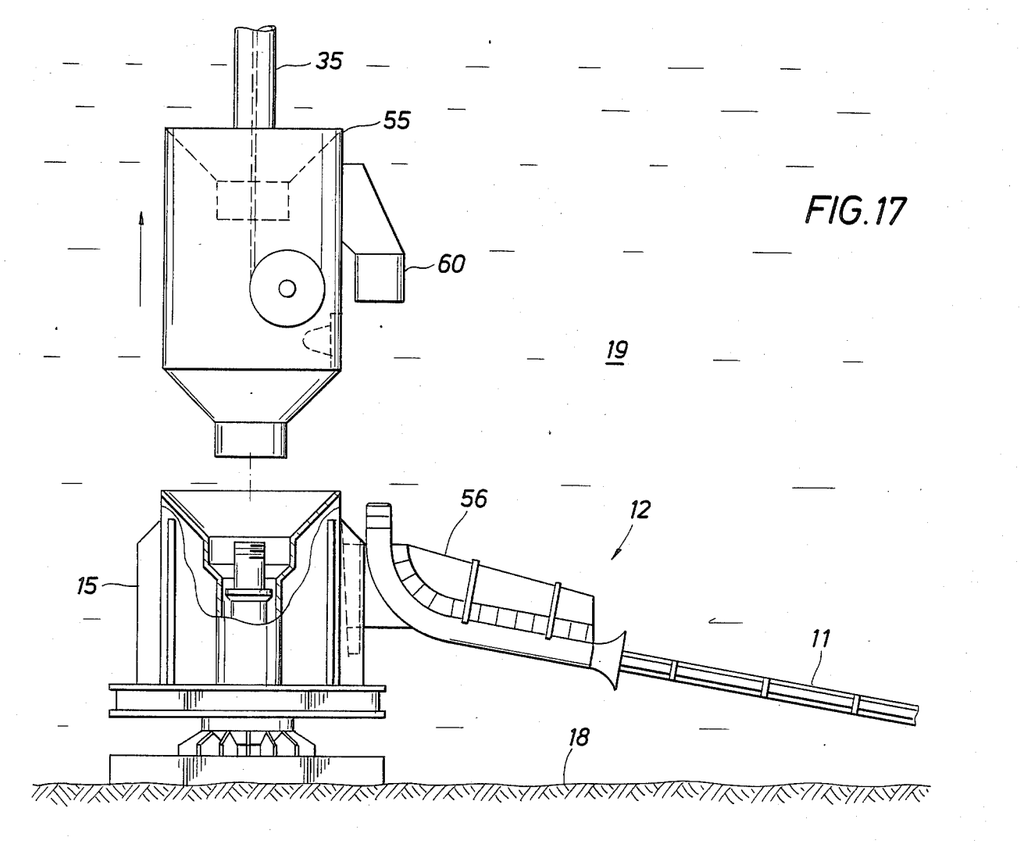

Referring now to FIGS. 15, 16 and 17 the connection of the first end 12 of the flexible conduit 11 to the first connection means 15 may be seen in more detail. The connection tool 55 has been deployed downwardly while suspended from a riser 35 to the vicinity of the first connection means 15, as discussed earlier, and thereafter has been landed and secured to the first connection means 15. A conduit terminal head 56 has been pulled towards the connection tool 55, the terminal head being connected to the first end 12 of the flexible conduit 11. The terminal head 56 has been pulled towards the tool 55 by means of pullcable 52 which may be driven by a winch carried by the tool 55 or by a winch mounted on the first vessel 25. In the embodiment illustrated in FIGS. 15–17, the conduit terminal head 56 is secured to the first connection means 15 by vertically inserting downwardly a dovetail tenon 58 of the terminal head 56 into a dovetail receptacle 59 forming a portion of a first connection means 15, by means of tenon ram 60 driven downward by hydraulic and/or electrical mechanical means well known to the art, and shown in FIG. 16. The connection tool 55 may then be recovered to the surface 23 of the body of water 19, as shown in FIG. 17.

It is well recognized that many other methods and apparatus may be used to connect the first end 12 of the flexible conduit 11 to the first connection means 15.

Referring again to FIGS. 1 through 5 the flexible conduit 11 may be operatively contacted to an outer surface 62 (FIG. 4) of the anchor block means 33 by movement of the vessel 29. The outer surface 62 is defined substantially vertical to the bottom 18 when the anchor block 34C is anchored to the bottom 18. A portion of the flexible conduit 11 may then be bent around a portion of the outer surface 62 of the anchor block means 33, in this case by the proper positioning and movement of the vessel 29 while maintaining sufficient tension in the flexible conduit. The radius R of the anchor block should be chosen so as to prevent buckling of the pipe or pipes which are bent around the anchor block in this manner. If D is the diameter of the largest pipe and t is its wall thickness, then safe bending (without buckling a pipe) will be assured if $R > D^2/t$, which formula is derived from numerous laboratory bend tests of pipe. Likewise, the height H of the anchor block should at least be equal to R/2 in order to prevent slippage of the flexible conduit over and past the anchor block during installation.

Figure 18:
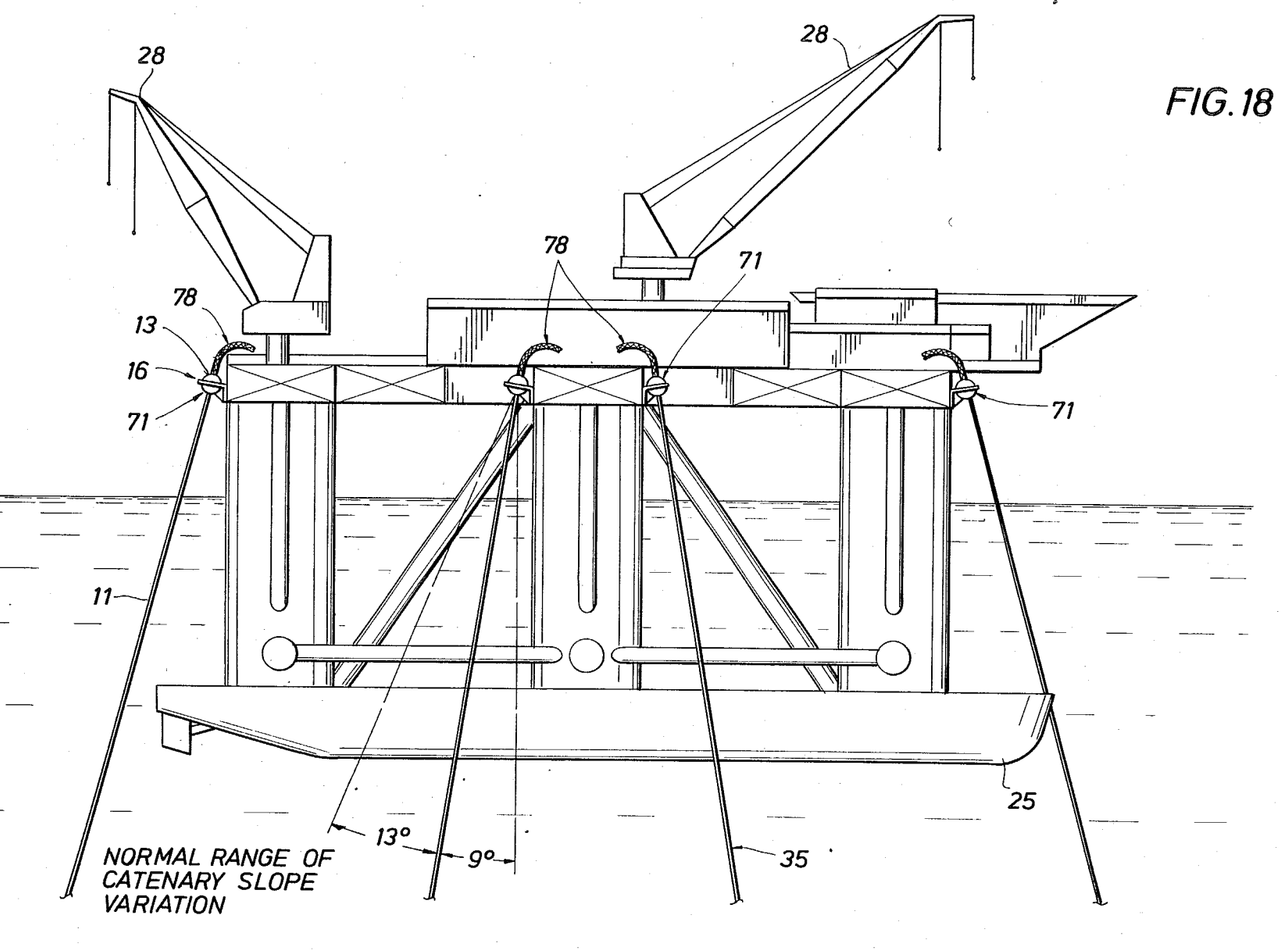
FIG. 18 is a schematic representation showing ball and socket riser supports carried by the first vessel.
Figure 19A:
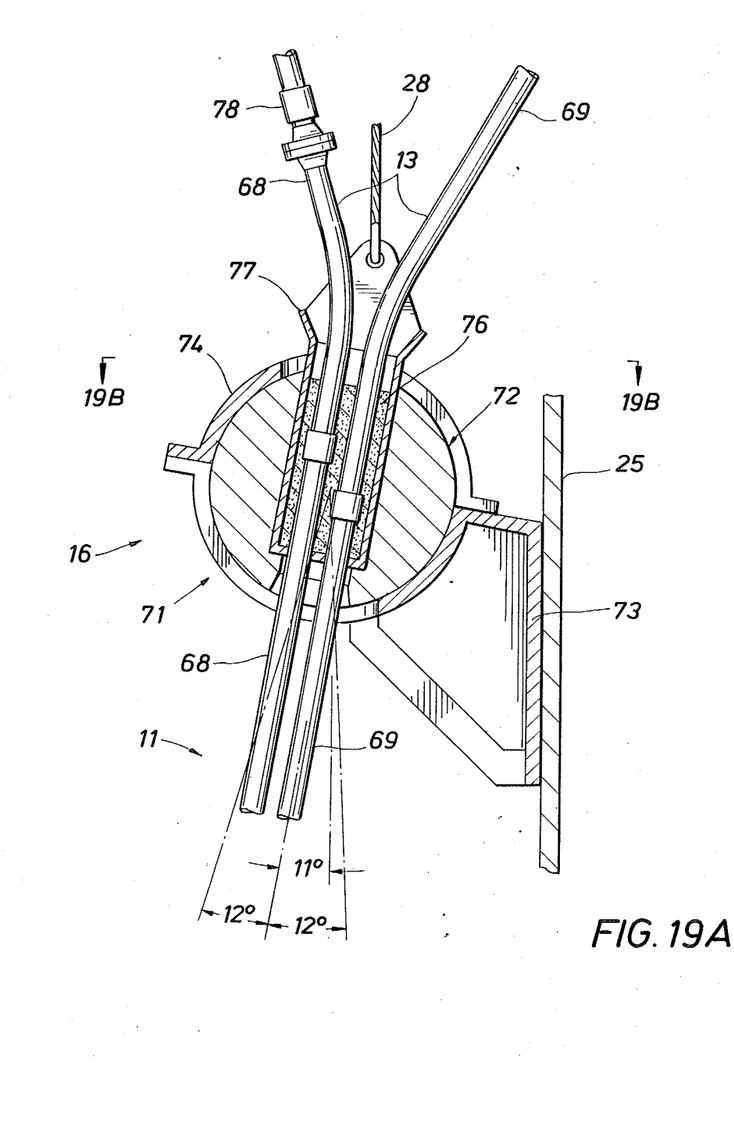
FIGS. 19A and 19B and schematic representations showing the second end of the flexible conduit connected to a riser support ball rotatably engaged with a mounting frame and socket.
Figure 19B:
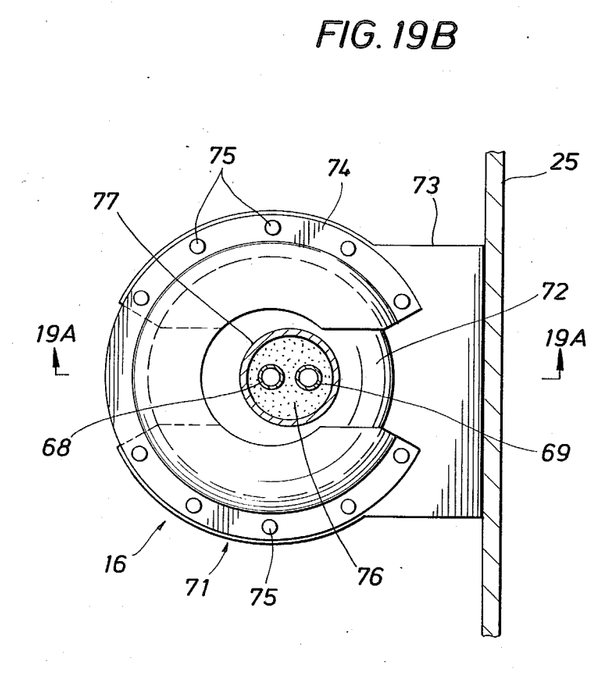

Referring now to FIGS. 1, 18, and 19 the method of connecting the second end 13 of a flexible conduit 11 to the second connection means 16 may be explained further. A substantially horizontal portion 32 of the flexible conduit 11 may be laid on the bottom 18 from the anchor block means 33 towards the second connection means 16, by use of the second vessel 29 being propelled towards the first vessel 25. Thereafter, a further portion 31 of the flexible conduit 11 may be suspended in a catenary manner between the horizontal portion 32 laid on the bottom 18 and the second vessel 29 floating upon the surface 23 of the body of water 19. The second vessel 29 may then be moved towards the second connection means 16 which are mounted upon first vessel 25, either inboard or outboard and either at deck level or at pontoon level, as shown in FIG. 18, and thereafter the second end 13 of the flexible conduit may be operatively connected to the second connection means 16.

In an embodiment of the present invention, as shown in FIGS. 18 and 19 the second end 13 of the flexible conduit 11 may be connected for example to a ball and socket riser support 71. The support 71 which forms the second connection means 16 comprises a ball 72 carried in rotatable engagement with mounting frame and socket 73, the ball 72 prevented from translational movement from socket 73 by a bolt down socket cap 74, secured to the socket 73 by bolts 75 as is well known to the art. The flexible conduit 11 may be placed through the flowline lifting head 77 carried by ball 72 and potting material 76 placed around the conduit 11, the ball 72 having an opening defined therethrough to accept the lifting head 77.

The second end 13 of the flexible conduit 11 may be formed by cutting the existing flexible conduit 11 away from the remaining section of the conduit 11 carried by the first vessel 29, and then the second end 13 may be passed through the ball 72 and lifting head 77 and potted, welded, or otherwise secured to the head 77.

By operation of the lift means 28, being part of the first vessel 25, the lifting head 77 and ball 72, with a portion of the flexible conduit 11 descending vertically downward therefrom, may then be suspended above the mounting frame and socket 73, which is operatively connected to the hull of the first vessel 25. The flowline lifting head 77 and ball 72 may then be lowered downwardly into contact with the socket 73 and the socket cap 74 bolted in place, thereby connecting the second end 13 of the flexible conduit 11 to the second connection means 16. Once the second end 13 is so positioned, being rotatably free but translationally fixed relative to the first vessel 25, further fluid and/or electrical connections may be made between the second end 13 and equipment of the floating production system 27, for example by means of flexible piping 78.

As mentioned earlier, whereas flexible conduit 11 is shown consisting of a flow line 68 and electrical conduit 69 it is well recognized that the conduit 11 may comprise a plurality of flowlines 68, either steel or composite, and/or electrical cables 69. It is well recognized that many other methods and apparatus may be used to connect the second end 13 of the flexible conduit 11 to the second vessel 25.

In order to install flexible conduit 11 consisting of steel pipes, composite pipes, and/or electrical cables forming a flowline bundle, a reel ship or equivalent vessel 29, would arrive at the field location with the full length of the flexible conduit 11 bundles spooled onto the main reel 70 shown in FIG. 1. The total flexible conduit 11 length would equal approximately four times the water depth times the number of wells, or approximately 12.1 miles for eight wells in a 2,000 foot water depth. Preferably the flow lines or pipes comprising the flexible conduit 11 bundle would be twisted into a helix with the pitch of the helix equal to or less than the circumference of the reel 70, in order to avoid problems with differential buckling or stretching of the several pipes forming the flexible conduit bundle. An electrical conduit 69 used as a control cable may be wrapped together with the flexible conduit 11 bundle or it may be laid from a separate reel located on the second vessel 29.

Alternatively, the flexible conduits 11 may be installed using a conventional laybarge or a J-lay vessel. For a laybarge installation the flexible conduit 11 would be assembled one joint at a time along a horizontal assemblyway. In order to operate in the deeper waters envisioned in this invention, namely 1500-3000 feet, the laybarge would have to be modified by use of a special stinger which controls bending and which releases the flexible conduit 11 in an essentially vertical orientation. Furthermore, the laybarge mooring system would have to be modified by addition of thrusters to permit dynamic positioning in the deeper waters.

For a J-lay operation the flexible conduit 11 would be assembled one joint at a time along a vertical assemblyway, preferably utilizing the central derrick and central moonpool of a conventional deepwater drilling vessel. Mounted inside and/or below the moonpool would be a special vertical stinger to control bending during the laying of the flexible conduit 11. Modifications of the positioning system probably would be unnecessary, as a dynamically positioned drilling vessel is well suited to operate in the 1500-3000 foot range of water depths.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A method of connecting a flexible conduit having a first end and a second end between a first connection means and a second connection means, said first connection means located adjacent the bottom of a body of water, said second connection means located adjacent the surface of said body of water and being capable of movement relative to said first connection means, said method comprising:
   installing anchor block means on the bottom of said body of water;
   connecting one of said ends of said conduit to one of said connection means;

operatively looping a portion of said conduit about said anchor block means; and connecting the other of said ends of said conduit to the other of said connection means, thereby connecting said flexible conduit between said first connection means and said second connection means.

2. A method of connecting a flexible conduit having a first end and a second end between a first connection means and a second connection means, said first connection means located adjacent the bottom of a body of water having a particular water depth, said second connection means located substantially vertically above said first connection means adjacent the surface of said body of water and being capable of movement relative to said first connection means, said method comprising:

installing anchor block means on the bottom of said body of water a selected distance from said first connection means;

connecting said first end of said conduit to said first connection means;

operatively looping a portion of said flexible conduit about said anchor block means; and connecting said second end of said conduit to said second connection means, thereby connecting said flexible conduit between said first connection means and said second connection means.

3. The method of claim 2 wherein the step of installing said anchor block means on the bottom of said body of water includes the further steps of;

lowering said anchor block means downward through said body of water, and contacting said anchor block means to said bottom of said body of water a selected distance from said first connection means.

4. The method of claim 3 including, after contacting said anchor block means to said bottom of said body of water, the steps of;

lowering at least one pile downwardly through said body of water, and driving said at least one pile downwardly through at least one pile conductor into said botom of said body of water, said at least one pile conductor provided for each of said at least one pile and operatively connected to said anchor block means, thereby anchoring said anchor block means to said bottom of said body of water.

5. The method of claim 3 including, after contacting said anchor block means to said bottom of said body of water, the step of;

adding additional weighted material to said anchor block means to increase the weight of said anchor block means.

6. The method of claim 3 including, after contacting said anchor block means to said bottom of said body of water, the steps of;

placing suction means in fluid communication with a suction cavity defined upwardly through the lower portion of said anchor block means, actuating a pump which forms a portion of said suction means, decreasing the pressure within said suction cavity, and thereby forcing said anchor block means downwardly into said bottom of said body of water.

7. The method of claim 3 wherein the step of contacting said anchor block means to said bottom of said body of water a selected distance from said first connection means further includes the step of;

equating the selective distance from said first connection means substantially equal to a multiple value between 1.0 and 2.0 of said water depth of said body of water.

8. The method of claim 2 wherein the step of connecting said first end of said flexible conduit to said first connection means includes the further steps of;

operatively connecting said first end of said flexible conduit from a second vessel to a riser from a first vessel, deploying said flexible conduit and said riser downwardly to said first connection means, connecting said riser to said first connection means, and connecting said first end of said flexible conduit to said first connection means.

9. The method of claim 8 including, subsequent to the step of connecting said first end of said flexible conduit to said first connection means, the steps of;

laying said flexible conduit on the bottom of said body of water proceeding away from said first connection means, and disconnecting said riser from both said flexible conduit and said first connection means.

10. The method of claim 8 including, subsequent to the step of connecting said first end of said flexible conduit to said first connection means, the steps of;

disconnecting said riser from both said flexible conduit and said first connection means, and laying said flexible conduit on said bottom of said body of water proceeding away from said first connection means.

11. The method of claim 2 wherein the step of connecting said first end of said flexible conduit to said first connection means includes the further steps of;

deploying a riser and a flexible conduit connection tool downwardly to said first connection means, landing and securing said flexible conduit connection tool onto said first connection means, pulling a conduit terminal head, said terminal head being connected to said first end of said flexible conduit, to said flexible conduit connection tool, securing said conduit terminal head to said first connection means vertically inserting a dovetail tenon of said conduit terminal head into a dovetail receptacle of said first connection means, and recovering said flexible conduit connection tool to said surface of said body of water.

12. A method of connecting a flexible conduit having a first and a second end between a first connection means and a second connection means, said first connection means located adjacent the bottom of a body of water having a particular water depth, said second connection means located substantially vertically above said first connection means adjacent the surface of said body of water and being capable of movement relative to said first connection means, said method comprising:

installing anchor block means on the bottom of said body of water a selected distance from said first connection means;

connecting said first end of said conduit to said first connection means;

operatively contacting a portion of said flexible conduit to said anchor block means;

connecting said second end of said conduit to said second connection means, thereby connecting said flexible conduit between said first connection means and said second connection means;

the step of operatively contacting a portion of said flexible conduit to said anchor block means further including the steps of:

laying said flexible conduit from said first connection means towards said anchor block means;

contacting said flexible conduit to an outer surface of said anchor block means, said outer surface defined substantially vertical to said bottom of said body of water when said anchor block means is anchored to said bottom; and bending a portion of said flexible conduit around a portion of said outer surface of said anchor block means.

13. A method of connecting a flexible conduit having a first and a second end between a first connection means and a second connection means, said first connection means located adjacent the bottom of a body of water having a particular water depth, said second connection means located substantially vertically above said first connection means adjacent the surface of said body of water and being capable of movement relative to said first connection means, said method comprising:

installing anchor block means on the bottom of said body of water a selected distance from said first connection means;

connecting said first end of said conduit to said first connection means;

operatively contacting a portion of said flexible conduit to said anchor block means;

connecting said second end of said conduit to said second connection means, thereby connecting said flexible conduit between said first connection means and said second connection means;

the step of connecting said second end of said flexible conduit to said second connection means including the further steps of:

laying a substantially horizontal portion of said flexible conduit on said bottom of said body of water from said anchor block means towards said second connection means;

suspending in a catenary manner a further portion of said flexible conduit between said horizontal portion laid upon said bottom and a second vessel floating upon said surface of said body of water;

moving said second vessel towards said second connection means; and operatively connecting said second end of said flexible conduit to said second connection means.

14. The method of claim 13 wherein the step of connecting said second end of said flexible conduit to said second connection means includes the further steps of;

connecting said second end of said flexible conduit to a flowline lifting head, said lifting head carriable within an opening defined downwardly through a portion of a ball, said ball capable of rotatable engagement with a mount frame and socket connected to said first vessel, said lifting head, ball, and mount frame and socket forming portions of said second connection means, suspending said flowline lifting head with a portion of said flexible conduit descending vertically downward therefrom above said mount frame and socket, and lowering said flowline lifting head downwardly into contact with said mount frame and socket, thereby connecting said second end of said flexible conduit to said second connection means.

15. The method of claim 12 wherein the step of suspending said flowline lifting head above said mounting frame and socket is done by;

connecting said flowline lifting head to conduit end lift means positioned above said second vessel, and moving said flowline lifting head to a position above said mounting frame and socket on said first vessel.

16. Apparatus for connecting a flexible conduit having a first end and a second end between a first connection means and a second connection means, said first connection means located adjacent the floor of a body of water having a particular water depth, said second connection means located adjacent the surface of said body of water and being capable of movement relative to said first connection means, said apparatus comprising:

anchor block means capable of being anchored at one location upon said bottom of said body of water and having an outer surface, at leat a portion of said outer surface forming a plane defined substantially vertical to said bottom when said anchor block means is anchored to said bottom;

means for installing said ancnor block means on the bottom of said body of water;

means for connecting said first end of said conduit to said first connection means;

means for operatively contacting a portion of said flexible conduit to said substantially vertical plane of said anchor block means when said anchor block means is anchored to said bottom; and means for connecting said second end of said conduit to said second connection means, thereby connecting said flexible conduit between said first connection means and said second connecction means.

17. Apparatus for connecting a flexible conduit having a first end and a second end between a first connection means, said first connection means located adjacent the floor of a body of water having a particular water depth, said second connection means located substantially vertically above said first connection means adjacent the surface of said body of water and being capable of movement relative to said first connection means, said apparatus comprising:

anchor block means capable of being anchored at one location upon said bottom of said body of water and having an outer surface, at least a portion of said outer surface forming a plane defined substantially vertical to said bottom when said anchor block means is anchored to said bottom;

means for installing said anchor block means on the bottom of said body of water a selected distance from said first connection means;

means for connecting said first end of said conduit to said first connection means;

means for operatively contacting a portion of said flexible conduit to said substantially vertical plane of said anchor block means is anchored to said bottom; and means for connecting said second end of said conduit to said second connection means, thereby connecting said flexible conduit between said first connection means and said second connection means.

18. The apparatus of claim 17 wherein the apparatus for installing said anchor block means on the bottom of said body of water further includes;

means for lowering said anchor block means downward through said body of water, and means for anchoring said anchor block means to said bottom of said body of water a selected distance from said first connection means.

19. The apparatus of claim 18 including, for use in anchoring said anchor block means to said bottom of said body of water;
   at least one pile,
   at least one pile conductor operatively engaged to said anchor block means and formed so as to receive and guide said at least one pile downwardly into said bottom,
   means for lowering said at least one pile downwardly through said body of water, and
   means for driving said at least one pile downwardly through said at least one pile conductor into said bottom of said body of water.

20. The apparatus of claim 17 wherein the apparatus for connecting said first end of said flexible conduit to said first connection means further includes,
   a first vessel floating adjacent said second vessel upon said surface,
   a second vessel initially carrying said first end of said flexible conduit and floating upon said surface of said body of water,
   a riser having a lower end lowerable from said first vessel,
   means for operatively connecting said first end of said flexible conduit to said lower end of said riser,
   means for deploying said flexible conduit and said lower end of said riser downwardly to said first connection means,
   means for connecting said lower end of said riser to said first connection means, and
   means for connecting said first end of said flexible conduit to said first connection means.

21. The apparatus of claim 17 wherein the apparatus for operatively contacting a portion of said flexible conduit to said anchor block means further includes;
   means for laying said flexible conduit from said first connection means towards said anchor block means,
   means for contacting said flexible conduit to the outer substantially vertical surface of said anchor block means, and
   means for bending a portion of said flexible conduit around a portion of said outer surface.

22. The apparatus of claim 17 wherein the apparatus for connecting said second end of said flexible conduit to said second connection means further includes;
   means for laying a portion of said flexible conduit on said bottom of said body of water from said anchor block means towards said second connection means,
   means for suspending in a catenary manner a further portion of said flexible conduit between said portion laid upon said bottom and said second end of said flexible conduit located adjacent said second connection means, and
   means for connecting said second end of said flexible conduit to said second connection means.

* * * * *